(12) United States Patent
Papastefanou

(10) Patent No.: US 9,361,509 B2
(45) Date of Patent: Jun. 7, 2016

(54) ELECTRONIC SIGNATURE AUTHENTICATION METHOD AND SYSTEM

(71) Applicant: Impression Signatures (Pty) Limited Ltd., Johannesburg (ZA)

(72) Inventor: Andrew Keneth Anthony Papastefanou, Benoni (ZA)

(73) Assignee: PROSENSE TECHNOLOGY (PROPRIETARY) LIMITED, Centurion (ZA)

( * ) Notice: Subject to any disclaimer, the term of this patent is extended or adjusted under 35 U.S.C. 154(b) by 0 days.

(21) Appl. No.: 14/367,594

(22) PCT Filed: Dec. 21, 2012

(86) PCT No.: PCT/IB2012/057577
§ 371 (c)(1),
(2) Date: Jun. 20, 2014

(87) PCT Pub. No.: WO2013/093864
PCT Pub. Date: Jun. 27, 2013

(65) Prior Publication Data
US 2015/0010216 A1  Jan. 8, 2015

(30) Foreign Application Priority Data

Dec. 23, 2011  (ZA) .................................. 11/9542

(51) Int. Cl.
*G06K 9/00* (2006.01)
(52) U.S. Cl.
CPC ........ *G06K 9/00181* (2013.01); *G06K 9/00154* (2013.01); *G06K 9/00174* (2013.01); *G06K 9/00194* (2013.01); *G06K 9/00422* (2013.01)

(58) Field of Classification Search
USPC .......................... 382/119, 120, 121, 122, 123
See application file for complete search history.

(56) References Cited

U.S. PATENT DOCUMENTS 6,081,610 A * 6/2000 Dwork et al. .................. 382/119
6,236,740 B1 * 5/2001 Lee ................................ 382/119
6,307,955 B1   10/2001 Zank et al.
(Continued)

FOREIGN PATENT DOCUMENTS

EP           1 970 836 A2      9/2008

OTHER PUBLICATIONS

International Search Report and Written Opinion for Application No. PCT/IB2012/057577 dated May 20, 2013.
(Continued)

*Primary Examiner* — John Strege
(74) *Attorney, Agent, or Firm* — Alston & Bird LLP

(57) ABSTRACT

A system and method for facilitating authentication of an electronic signature includes receiving electronic signature data associated with an electronic signature of a signer, the electronic signature data comprising at least biometric data associated with at least one of the electronic signature and the signer. A signature icon is generated by using at least the received electronic signature data, wherein the signature icon comprises a coded visual representation of the electronic signature data. The signature icon is provided on a document signed by the signer by way of the electronic signature such that the signature icon is exhibited on the document at least when the document is printed or when the document is displayed on a display screen associated with a computing device or machine, wherein the signature icon facilitates authenticating the electronic signature of the signer.

16 Claims, 9 Drawing Sheets

(56) References Cited

U.S. PATENT DOCUMENTS

| | | | |
|---|---|---|---|
| 7,068,821 B2 * | 6/2006 | Matsutani | 382/119 |
| 7,107,454 B2 * | 9/2006 | Mori et al. | 713/180 |
| 7,406,599 B1 * | 7/2008 | Pravetz et al. | 713/176 |
| 7,614,551 B2 | 11/2009 | Kingsley-Hefty | |
| 7,869,634 B2 * | 1/2011 | McOwan et al. | 382/119 |
| 8,200,975 B2 * | 6/2012 | O'Connor et al. | 713/176 |
| 8,542,889 B2 * | 9/2013 | Sarnoff | 382/123 |
| 8,612,763 B1 * | 12/2013 | Axel et al. | 713/176 |
| 8,612,769 B2 * | 12/2013 | Guenther | 713/186 |
| 8,978,974 B2 * | 3/2015 | Voigt | 235/380 |
| 2003/0084305 A1 | 5/2003 | Siegel et al. | |
| 2003/0138135 A1 * | 7/2003 | Chung et al. | 382/119 |
| 2007/0280511 A1 * | 12/2007 | Nepomniachtchi et al. | 382/119 |
| 2008/0296375 A1 * | 12/2008 | Haas et al. | 235/386 |
| 2010/0254578 A1 * | 10/2010 | Modir Shanechi et al. | 382/119 |
| 2011/0228991 A1 * | 9/2011 | Hicks et al. | 382/119 |

OTHER PUBLICATIONS

International Preliminary Report on Patentability for Application No. PCT/IB2012/057577 dated Jul. 7, 2014.

* cited by examiner

ELECTRONIC SIGNATURE AUTHENTICATION METHOD AND SYSTEM

BACKGROUND OF THE INVENTION

THIS invention relates to an electronic signature authentication method and system.

Legal documents such as contracts, agreements and affidavits etc. typically require a handwritten signature from signatories thereto in order to render the same legally binding. The signature is assumed to be original and is normally considered enough evidence in the authentication of the signing parties when the document is under dispute. This outdated pen-to-paper approach has however caused several problems in the legal and administrative domains relating to fraudulent activities, misplaced documentation and forgery.

Electronic signatures aim to solve the administrative problems around document management whilst trying to duplicate the traditionally accepted action of physically signing a document. Rather than print out reams of documentation for the purpose of signing, the document is rather displayed on-screen. The signer is then asked to sign on an electronic pad (or tablet) with a stylus (in a manner similar to signing with a real pen on paper) and the electronic signature representation (otherwise referred to the electronic signature) is then applied to the document displayed on-screen. Various electronic security measures exist to enforce that the document cannot then be altered in its electronic format after it has been electronically signed. In its electronic format, digital certificates and tokens containing the signing data can be attached to the document to ensure successful authentication of the signer should the document come under dispute.

It is not always possible or viable to keep the signed document in electronic format however and it may inevitably need to be printed out. It is in this case that electronic signatures have failed to solve the legal problems surrounding documents and their authentication. It is probably due to this reason alone that it is still required for many legally binding documents to be signed as originals using the pen-to-paper method.

The present invention seeks at least to address the above-mentioned problem/s.

SUMMARY OF THE INVENTION

According to a first aspect of the invention, there is provided a method for facilitating authentication of an electronic signature, the method comprising:
  receiving electronic signature data associated with an electronic signature of a signer, the electronic signature data comprising at least biometric data associated with the electronic signature and/or the signer;
  generating a signature icon or token by using at least the received electronic signature data, wherein the signature icon or token comprises a coded visual representation of the electronic signature data; and
  providing the signature icon or token on a document signed by the signer by way of the electronic signature such that the signature icon or token is exhibited on the document at least when the document is printed or when the document is displayed on a display screen associated with a computing device or machine, wherein the signature icon or token facilitates authenticating the electronic signature of the signer.

The method may comprise receiving electronic signature data via an electronic signing device, for example, a tablet computing device and an associated writing implement. The signer may sign their signature on the tablet computing device by way of the associated writing implement in a conventional fashion to signing a handwritten signature thereby to generate the electronic signature.

The method may comprise receiving electronic signature data comprising information indicative of one or more of spatial co-ordinates of the writing implement relative to the tablet computing device when the signer signs their signature, pressure of the strokes used by the signer when executing their signature by way of the electronic signing device, and a time based metric of the user signing their signature, for example, the speed at which signature strokes were made. The electronic signature received may comprise information indicative of one or more of the order and direction of signature strokes, and information indicative of when the writing implement was lifted between strokes during signing.

It will be appreciated that the signature icon may be a machine readable icon, which when read by a suitable machine, enables the machine to derive at least the biometric data associated with the electronic signature. In a preferred example embodiment, the method comprises visually replicating the electronic signature of the signer thereby facilitating authentication of the electronic signature of the signer.

The signature icon may comprise a machine readable matrix or 2-dimensional code, for example a QR (Quick Response) code. The method may therefore comprise the steps of compressing and/or encoding and/or encrypting the received electronic signature data according to a predetermined algorithm, and generating the machine readable matrix or 2-dimensional code.

According to a second aspect of the invention, there is provided a system for facilitating authentication of an electronic signature, the system comprising:
  signature data receiver module configured to receive electronic signature data associated with an electronic signature of a signer, the electronic signature data comprising at least biometric data associated with the electronic signature or signer;
  an icon generating module configured to generate a signature icon by using at least the received electronic signature data, wherein the signature icon comprises a coded visual representation of the electronic signature data; and
  a document updating module configured to provide the signature icon on a document signed by the signer by way of the electronic signature such that the signature icon is exhibited on the document when the document is printed or when the document is displayed on a display screen associated with a computing device or machine, wherein the signature icon facilitates authenticating the electronic signature of the signer.

The system, particularly the signature data receiver module, may be communicatively coupled with an electronic signing device, for example, an electronic signature pad or tablet computing device and an associated writing implement to receive electronic signature data therefrom.

The signature data receiver module may be configured to receive electronic signature data comprising information indicative of one or more of spatial co-ordinates of the writing implement relative to the tablet computing device when the signer signs their signature, pressure of the strokes used by the signer when executing their signature by way of the electronic signing device, speed at which the signature strokes were made, order and direction of signature strokes, and information indicative of when the writing implement was lifted between strokes during signing.

The signature icon may be a machine readable icon, which when read by a suitable machine, enables the machine to derive at least the biometric data associated with the electronic signature. In a preferred example embodiment, the suitable machine is configured to visually replicate the electronic signature of the signer thereby facilitating authentication of the electronic signature of the signer.

The signature icon may comprise a machine readable matrix or 2-dimensional code, for example a QR (Quick Response) code. The icon generating module may therefore be configured to encrypt the received electronic signature data and generate the machine readable matrix or 2-dimensional code.

DESCRIPTION OF PREFERRED EMBODIMENTS

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
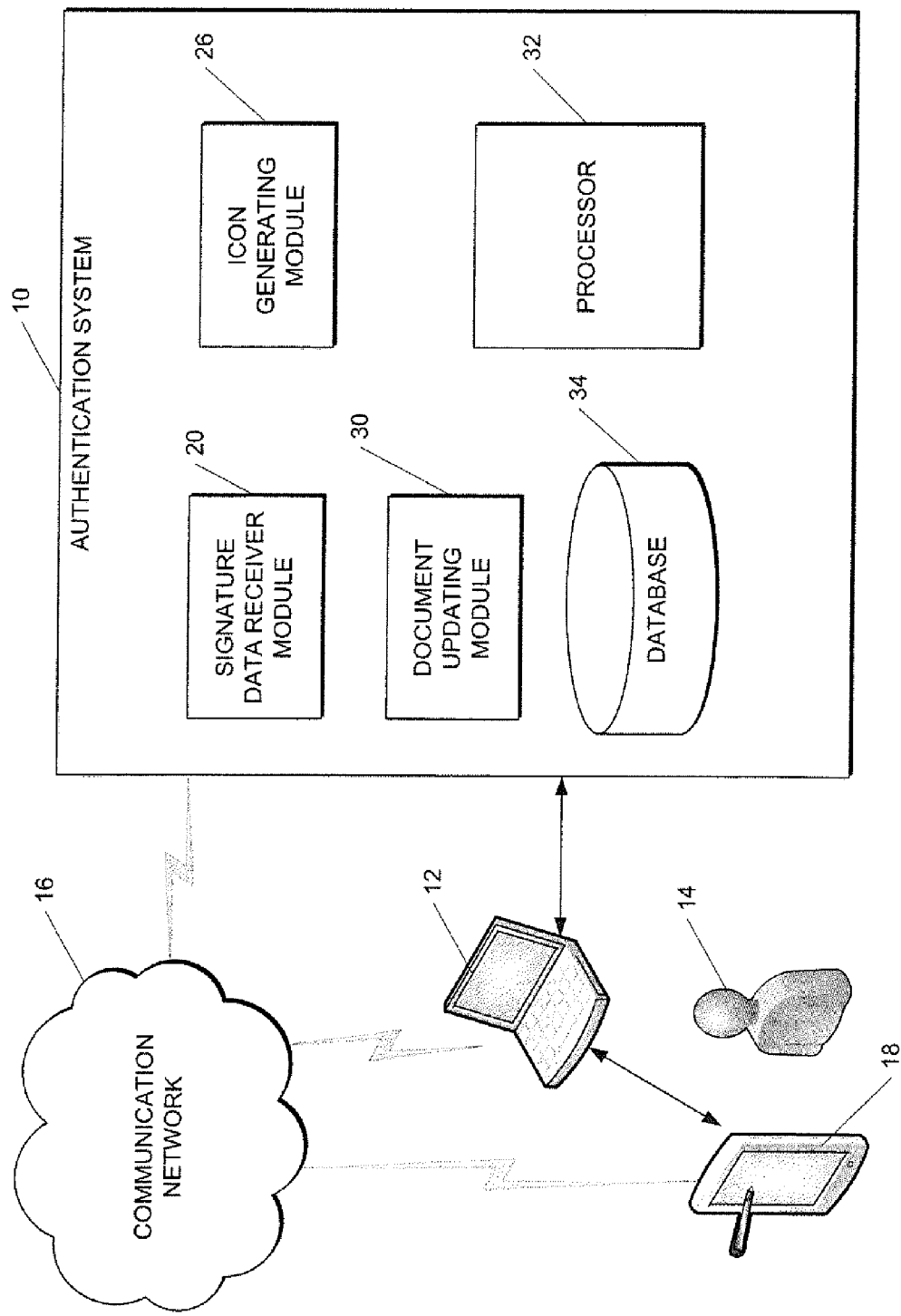
FIG. 1 shows a schematic diagram of a system for facilitating authentication of an electronic signature in accordance with an example embodiment.

Referring firstly to FIG. 1 of the drawings where a system for facilitating authentication of an electronic signature is generally indicated by reference numeral 10.

The system 10 may be integrated into or provided, at least in part, in the computing device 12 associated with a user 14. It follows that one or more of the components of the system 10 as described below may be provided by the associated computing device 12, for example, as a set of computer executable instructions (computer program or code) to achieve the desired functionality described herein. The computing device 12 may be a laptop computer, PC (personal computer), tablet PC, or the like associate with the user 14.

Instead, or in addition, the system 10 may be a standalone system, e.g., provided in one or more remote server/s, configured to provide one or more functionalities described herein to a user 14 via a communications network 16, for example, the user 14 may access the system 10 (e.g., automatically) and receive complete functionality therefrom via a communications cloud or network 16.

The communications network 16 may therefore be a packet-switched network and may form part of the Internet. Instead, or in addition, the communications network 16 may be a circuit switched network, public switched data network, or the like. In certain example embodiments, the network 16 may be a telecommunication network, for example, a cellular or mobile telecommunication network. It will be appreciated that the communications network 16 may be one or more varying communication networks enabling a user 14 to access the system 10 remotely via a suitable computing device 12 operatively connected to the network 16.

The system 10 may further be in communication with an electronic signing device 18. The writing device 18 may be any electronic device configured to receive handwritten inputs from the user 14 electronically in order to reproduce the handwritten inputs in an electronic format to be visually substantially similar to the handwritten inputs received by the electronic device 18. For example, the device 18 may comprise a tablet computing device with a suitable electronic signing implement such as a stylus or an electronic pen to receive handwritten inputs from the user 14. The system 10 may be in communication with the electronic signing device 18 via the computing device 12, or the network 16.

It will be understood by those skilled in the field of invention, that the electronic signing device 18 may be integral with the computing device 12, for example, where the computing device 12 is a tablet PC. It will be appreciated that the stylus may be optional as certain computing devices, e.g., touch screen tablet PCs allow for users 14 to input handwritten data via finger touch/pressure or in other words capacitance.

Similarly as described above with reference to the computing device 12, the system 10 may be configured to communicate with the electronic signing device 18 via the communications network 16.

Any combination of the device 18 being connected directly to the computing device 12, the system 10, or one or both of the aforementioned via the communications network 16 is possible.

In addition, it will be further appreciated that many combinations of the aforementioned components is realizable. However, these configurations will not detract from the invention disclosed herein.

Further, it will be noted that only one user 14, computing device 12, and device 18 is illustrated. However, the invention may extend to multiple users 14, computing devices 12 and devices 18 operatively connected/connectable to the system 10 (for example, via a local area network, wide area network, or the like).

In any event, the system 10 may comprise a plurality of components or modules which correspond to the functional tasks to be performed by the system 10. In this regard, "module" in the context of the specification will be understood to include an identifiable portion of code, computational or executable instructions, data, or computational object to achieve a particular function, operation, processing, or procedure. It follows that a module need not be implemented in software; a module may be implemented in software, hardware, or a combination of software and hardware. Further, the modules need not necessarily be consolidated into one device but may be spread across a plurality of devices, for example, across the network 16 (and/or optionally the computing device 12 and/or optionally the device 18) to provide the functionality described herein to the user 14.

Figure 2:
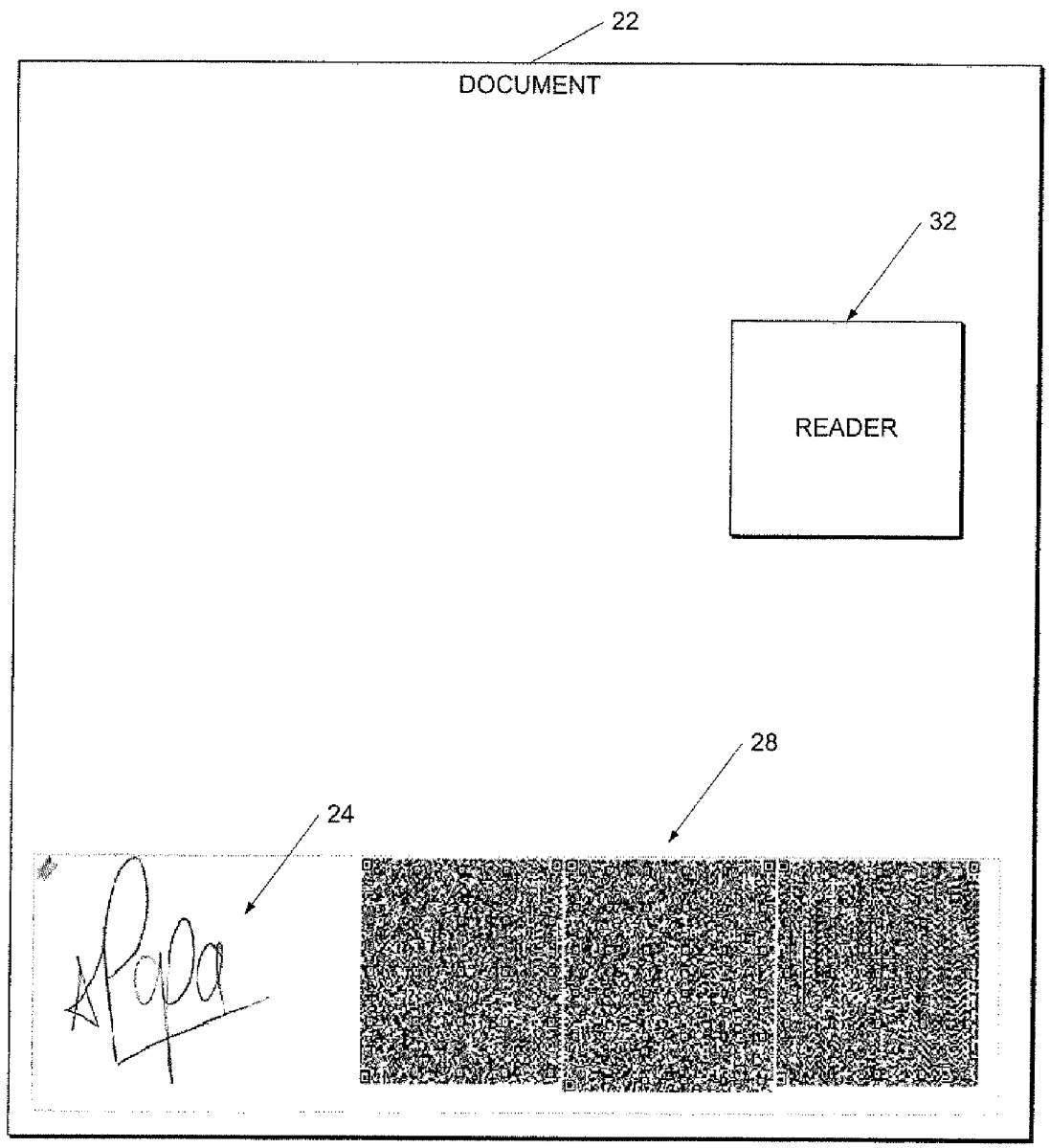
FIG. 2 shows an illustration of a document comprising an electronic signature and a signature icon in accordance with an example embodiment.

To this end, the system 10 may comprise a signature data receiver module 20 configured to receive electronic signature data associated with an electronic signature of the user 14. The user 14 is typically a signer of documents, for example, a document 22 (FIG. 2). In one example embodiment, the document 22 is any document which requires a signature from the user 14. For example, the document 22 may be a document which the signing thereof renders the document 22 legally binding, for example, a legal contract.

The document 22 is typically an electronic document, for example, an electronic text document provided on the computing device 12 which may be signed by the user 14 electronically by way of the electronic signing device 18. In this regard, it will be appreciated that the user 14 signs via the electronic signing device 18 in a conventional manner as they would their conventional written/handwritten signature via conventional pen and paper. The device 18 receives the physical input of the signature being scribed by the user 14 and converts the same to electrical signals or electronic signature data which may be reproduced in a digital domain, e.g., as an electronic written signature 24 on the document 22 in the computing device 12.

In other words, an electronic scanning/rendering of the written signature or in other words the electronic signature 24 (which substantially corresponds visually to the signature signed via the device 18), is generated by the device 18 and is available for use, for example, to be affixable to the document 22 in the digital domain. Once the document 22 is printed, the electronic signature 24 is also printed along with the document 22 which serves to identify the document 22 as being signed by the user 14 and being legally binding in certain circumstances.

Further, for clarity and brevity, the electronic signature 24 will be interchangeably referred to as the handwritten or written signature as is visually resembles the same despite being created on an electronic signature pad or tablet device 18. In this regard, it will be noted that the electronic signature 24 is generated exactly as a handwritten signature would be showing thickness in the pen stroke where pressure is applied to the stylus.

In one example embodiment, the module 20 may be communicably coupled to the device 18 to receive electronic signature data therefrom.

In any event, the above signing of the document 22 electronically by way of the electronic signature 24 often leads to problems relating to authenticity thereof when the same is printed physically, which the present invention seeks to address. Simply stated, once provided on a document, there is no convenient, quick and efficient way of authenticating the electronic signature 24 when the same is printed along with the document 22. Conventional methodologies include a printed copy of the document 22 with the printed electronic signature 24 being compared alongside a freshly written signature of the user 14 on paper. This methodology is tedious and the present invention thereby advantageously seeks to address this problem of authenticating electronic signatures 24, and hence documents 22 to which the same are affixed to, in a more convenient, quicker, efficient, and accurate manner.

Returning to the discussion relating to the system 10, particularly the module 20, it will be noted that electronic data received by the module 20 from the electronic signing devices 18 conveniently comprise biometric data associated with the electronic signature 24 or signer (as will be described in greater detail below). In certain example embodiments, at least some of this received electronic data is used to generate the electronic signature 24 which is affixable to the document 22. However, in certain other example embodiments, this electronic signature data is not utilized in the manner as herein described for purposes of authentication.

In this regard, the system 10 advantageously comprises an icon generating module 26 configured to generate a signature icon or token 28 by using at least the received electronic signature data comprising the biometric data associated with the electronic signature 24 and/or the signer 14. The signature icon 28 typically comprises a coded visual representation of the electronic signature data comprising the received biometric data.

The system 10 further comprises a document updating module 30 configured to provide the generated signature icon 28 on the document 22 signed by the signer 14 by way of the electronic signature 24 such that the signature icon 28 is exhibited on the document 22 when the document 22 is printed or when the document 22 is displayed on a display screen associated with a computing device or machine 12 (as illustrated substantially in FIG. 2). The document updating module 30 is also configured to lock the electronic document 22 from further modification as will be described below. Once locked or in read-only mode, one or more of the document 22, electronic signature 24 or icon 28 invalidates when one or more of the document 22, the electronic signature 24, or signature icon 28 has been tampered with. This advantageously prevents tampering.

It will be appreciated that the signature icon 28 is also advantageously printed with the electronic signature 24 on the document 22 when the document 22 is printed and thereby facilitates authenticating the electronic signature 24 of the signer 14 (discussed below).

To this end, the signature icon 28 may be a machine readable visual icon, which when read visually or optically by a suitable machine 32 enables the machine 32 to derive at least biometric data associated with the electronic signature 24, and optionally to recreate or replicate the corresponding electronic signature 24, for example, a 3-dimensional representation of the electronic signature 24 for purposes of comparing the same to the electronic signature 24 already provided on the document 22 thereby to facilitate authentication of the electronic signature 24 as described herein.

In a preferred example embodiment, the module 26 may be configured to generate the signature icon 28 to comprise a machine readable matrix or 2-dimensional code/barcode, for example, a QR (Quick Response) code. The icon generating module 26 may therefore be configured to compress and/or encrypt and/or encode the received raw electronic signature data, for example, via a mathematical algorithm (discussed below when the biometric data is further discussed) to prevent tampering of the electronic signature data, and generate the machine readable matrix or 2-dimensional code. QR codes are preferably generated by the module 26 as they are easily readable and capable of handling errors introduced through printing or scanning.

In any event, it is important that the signature icon 28 is a visual representation which is based on a robust standard that can be easily scanned and interpreted even after the document 22 has been printed, faxed or has lost image quality through some other mechanism.

It will be appreciated that the reader 32 may be a dedicated electronic reader (for example, forming part of the system 10) coupled to or comprising a display, or a smart device, such as a smart phone (including a suitable display) configured to read the icon 28. These devices 32 may use conventional protocols associated with the generated icon 28 to de-code the same and to derive biometric data therefrom. In addition, the devices 32 may be configured to use the derived biometric data to generate an example representation of the electronic signature 24 from the de-coded data, for example, on an associated display or for printing via a printer. It will be noted that in some example embodiments, the reader 32 may be coupled to the system 10 to enable only specifically coupled readers 32 to be able to de-code the icon 28 to reproduce the electronic signature 24.

To re-iterate, the reader 32 may de-code and/or de-compress and/or decrypt the icon 28 via a standard method to use the de-coded and/or decompressed and/or decrypted electronic signature data (comprising the biometric data) associated with the electronic signature 24 or signer 14, to authenticate the electronic signature 24 of the signer 14. In a preferred example embodiment, the reader 32 may be configured to visually recreate or replicate the electronic signature 24 of the signer 14 by using the derived biometric data thereby facilitating the authentication referred to above. However, it will be appreciated that in other example embodiments (not discussed further), the reader 32 merely re-creates the electronic signature from instructions to do so de-coded or derived from the read icon 28.

As an aside, it will be understood that what the reader 32 does with the biometric data depends on the purpose of the reader 32 (and there could be several purposes). For example, the reader 32 could store the biometric data for presentation at a later point, it could pass it over a network 16 for authentication, it could recreate the visual representation of the electronic signature 24, it could authenticate the signature 24 directly, or it could provide forensic statistics that could be useful in the analysis of the signature 24.

Regarding the biometric data, reference will now be made to FIGS. 3 to 11 of the drawings where the biometric data received by the module 20 and used by the module 26, will discussed further with reference to these drawings. Firstly, it will be understood that the biometric data received by the module 20 may be varied as electronic signing devices 18 (e.g., tablets) capture a wealth of raw data related to the position of the stylus during the signing action by the user 14. The biometric data received therefore may comprise information indicative of one or more of spatial co-ordinates of the writing implement relative to the tablet computing device 18 when the signer 14 signs their signature, and pressure of the strokes used by the signer when executing their signature by way of the electronic signing device, for example, (however not limited to) one or more of:
1. The X co-ordinate of the stylus over the device 18
2. The Y co-ordinate of the stylus over the device 18
3. Whether the stylus is touching the surface of the device 18
4. The pressure of the stylus whilst it is touching the surface of the device 18

Figure 3:
FIG. 3 shows a front 2-dimensional view of a signature of a signer without lifts.
Figure 4:
FIG. 4 shows a 3-dimensional rotated view (indicating pressure) of the signature of FIG. 3 without lifts.

Optionally, in addition, the biometric data received by the module 20 and used by the module 26 may comprise a time based metric of the user signing their signature or in order words the above listed data over the dimension of time, for example, one or more of:
1. The speed at which the signature strokes were made
2. The order and direction of signature strokes
3. When the stylus was lifted between strokes FIGS. 3 and 4 represents a portion of the data stored in the signature icon barcodes 28 that indicate the points captured over time including their pressure. For the purposes of this example, points captured with a pressure of 0 or less indicates that the stylus was lifted from the device 18 and they are ignored. FIG. 3 shows the recreation of the signature based on the biometric data from the front view whereas FIG. 4 shows a rotated view of the signature allowing an authenticator to view the pressure applied to the pen strokes as the signature was signed. The combination of timing and pressure allows the authenticator to also view the order and direction of the pen strokes (another valuable asset in determining whether the signer was the true and valid signer).

Figure 5:
FIG. 5 shows a front 2-dimensional view of a signature of a signer with lifts.
Figure 6:
FIG. 6 shows a 3-dimensional rotated view of the signature of FIG. 5 with lifts.
Figure 7:
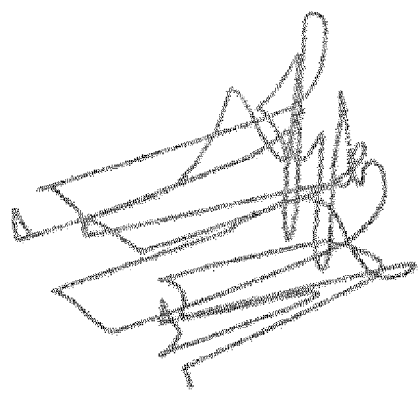
FIG. 7 shows a 3-dimensional side view (indicating pressure) of the signature of FIG. 5 with lifts.
Figure 8:
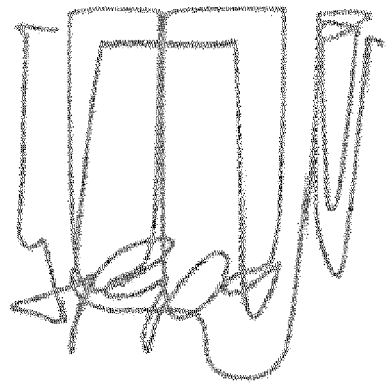
FIG. 8 shows a 3-dimensional top view (indicating pressure) of the signature of FIG. 5 with lifts.

FIGS. 5 to 8 includes both the data examined in FIGS. 3 and 4 and the additional element of lift allowing the authenticator to examine where the stylus left the device 18 between strokes. FIG. 5 shows the recreation of the signature including the lift information forming a solid action between all the characters and strokes in the signature. It is evident from the diagram that the last 'a' character in the signature was signed and the stylus moved down and then across to under the first 'p' to begin the signing of the squiggly line. Only the true signer would be able to create the same pattern during their signing action and since it occurred while the pen was lifted, it would be impossible for a fraudster to recreate. FIGS. 6 to 8 indicate the 3D rotations around the signature for authentication purposes.

Figures 9, 10:
FIG. 9 shows a graphical representation of an X-Component of a signature over time (indicating speed) uncompressed.
FIG. 10 shows a graphical representation of an X-Component of a signature over time (indicating speed) compressed.
Figure 11:
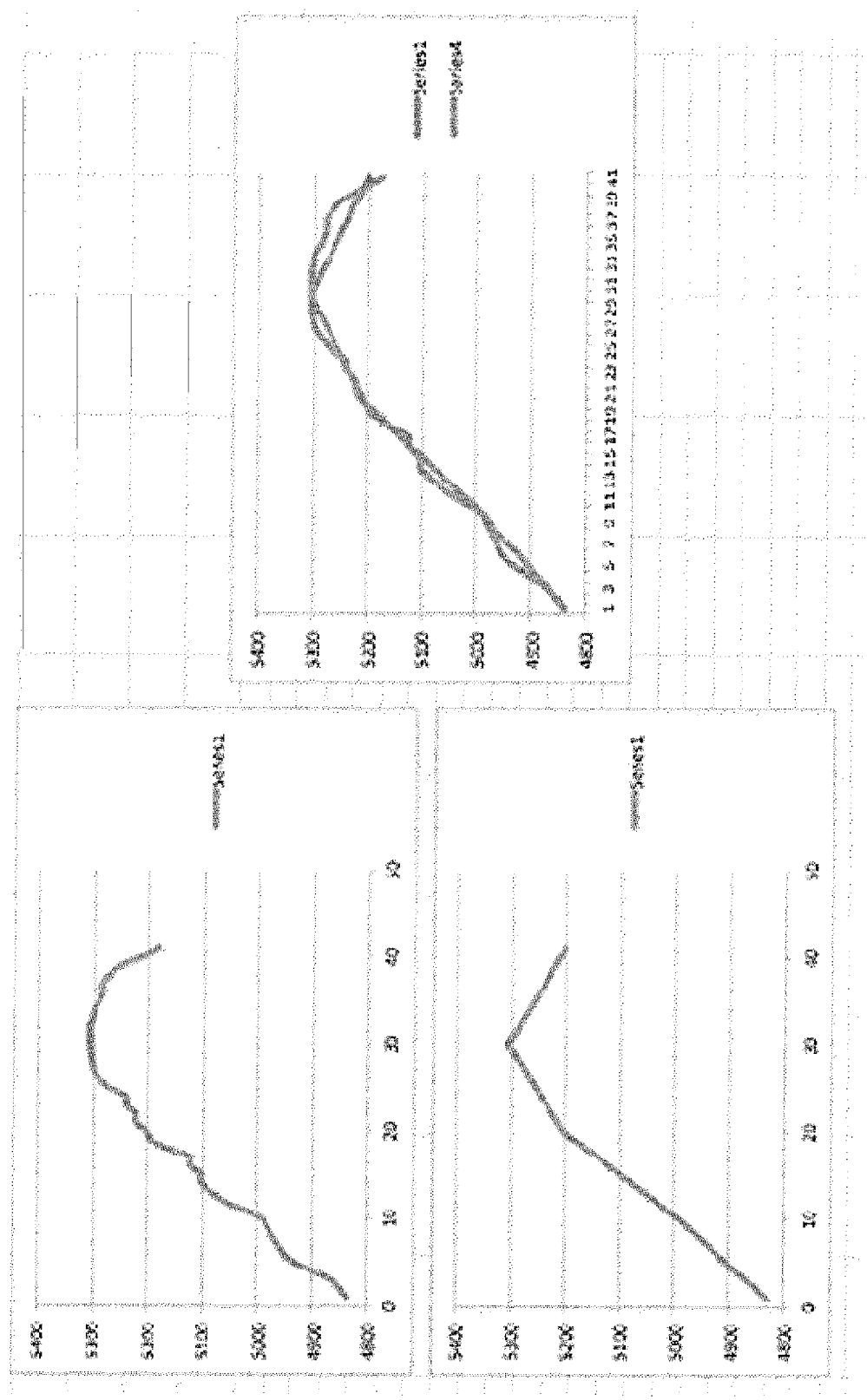
FIG. 11 shows a graphical representation of an approximation of an X-Component as a function to enable compression.

FIGS. 9 to 11 shows a single component of the signature recorded over time namely the X-Component (relative to the device 18). For two reasons, the raw biometric information must be compressed by the module 26. Firstly, in order for QR Codes 28 to be readable, they must not contain too much information and compressing the information allows for a simpler, more readable barcode. The method of compression used allows for the signature to be compressed to 10% of it's original size. Compressing the information using a particular mathematical algorithm stops users from reading the biometric data without permission. This step may be used in place of the encryption hereinbefore mentioned. The data is therefore stored securely on the document 22. FIG. 9 shows the X-component values over time before compression. FIG. 10 shows the X-component values over time after compression to 10% of its size. FIG. 11 on the other hand overlays the compressed curve with the uncompressed data to show fit.

Following on from the last paragraph, it will be noted that in certain preferred example embodiments, each of the raw electronic signature components (X, Y and pressure) of the electronic signature data received are considered in turn against the constant variable of time. The signature component is plotted against the Y domain and time is plotted against the X domain in a two-dimensional space providing a curved graph of component. By taking points at equal distances along the curve, the graph can be approximated by using the straight line formula $y=mx+c$. This aids in the compression and encryption of the components as, e.g., 20 integer points along the curve can be squeezed into a space of 2 integers (m and c). Knowing the distance between the points in the approximation along with the stored m and c variables allows the solving of the equation and the graph can be reconstructed. The distance between the points is encrypted and stored along with the straight line variables (which are stored unencrypted) in the icon 28 for reconstruction.

Returning to the system 10, it will be appreciated that the system 10 may further comprise a processor 32 configured to control or orchestrate the operation of the various components of the system 10. In certain example embodiments, some or all of the modules described herein may be provided as code modules in the processor 32 or in a database 34 such that the processor 32 is configured to render the functionality as described herein with reference to the modules. In further example embodiments, the processor 32 and the database 34 are provided in the computing device 12 and may be associated with a CPU and memory of the device 12 respectively. However in order example embodiments, the processor 32 may be one or more microprocessors, controllers, or any other suitable computing device, resource, hardware, software, or embedded logic. In addition, the database 34 may include a machine-readable medium, e.g. memory in the processor 32, main memory, and/or hard disk drive, which carries a set of instructions to direct the operation of the processor 32.

In certain example embodiments, it will be noted that that the system 10 as described herein also includes the computing device 12 and the device 18.

In summary, it will be appreciated that system 10 as hereinbefore described records the raw biometric data associated with the signature as an icon or token 28 which is stored electronically with the document 22 and displays the biometric data visually with the signature 24 so that if it is printed out, the biometric data can be reconstructed for the purposes of authentication.

Figure 12:
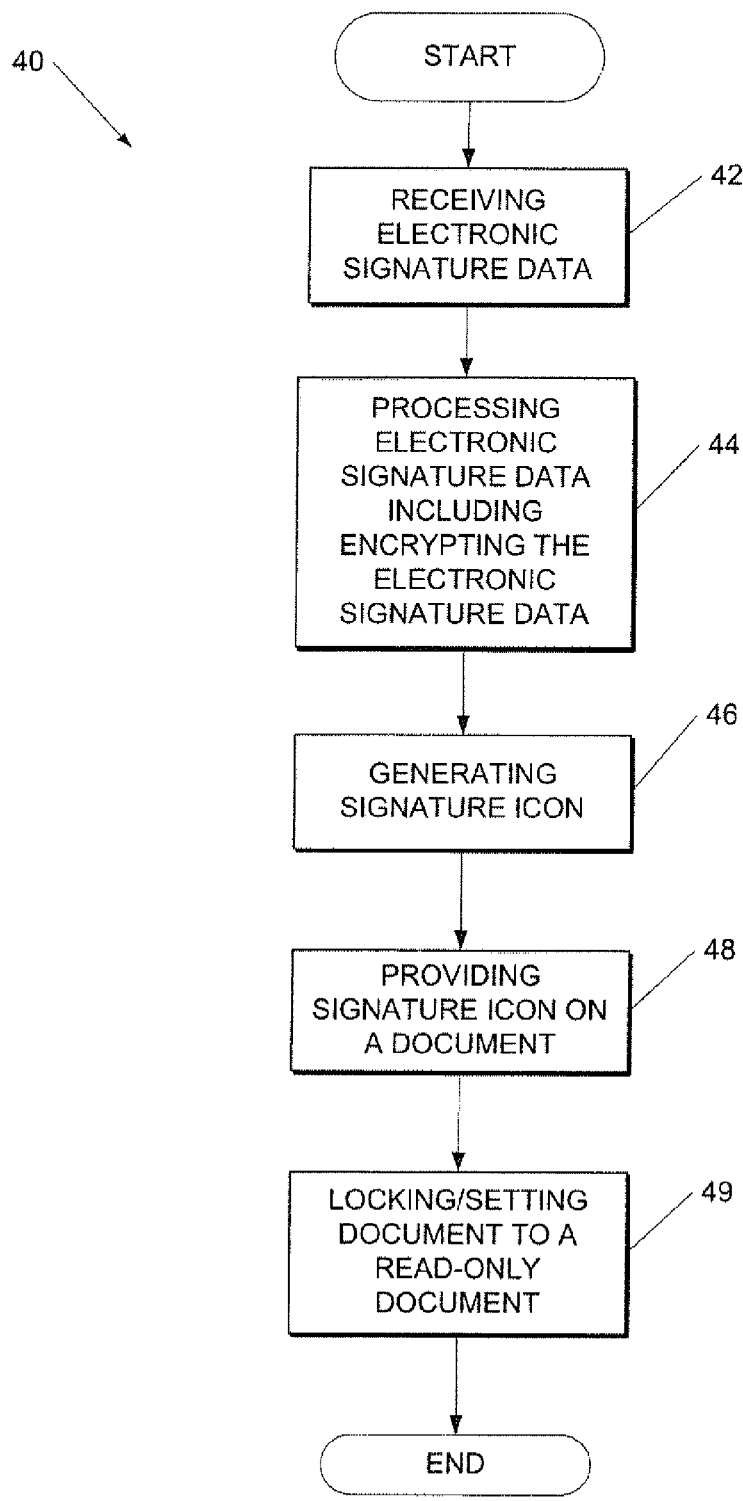
FIG. 12 shows a high level flow diagram of a method for facilitating authentication of an electronic signature in accordance with an example embodiment.
Figure 13:
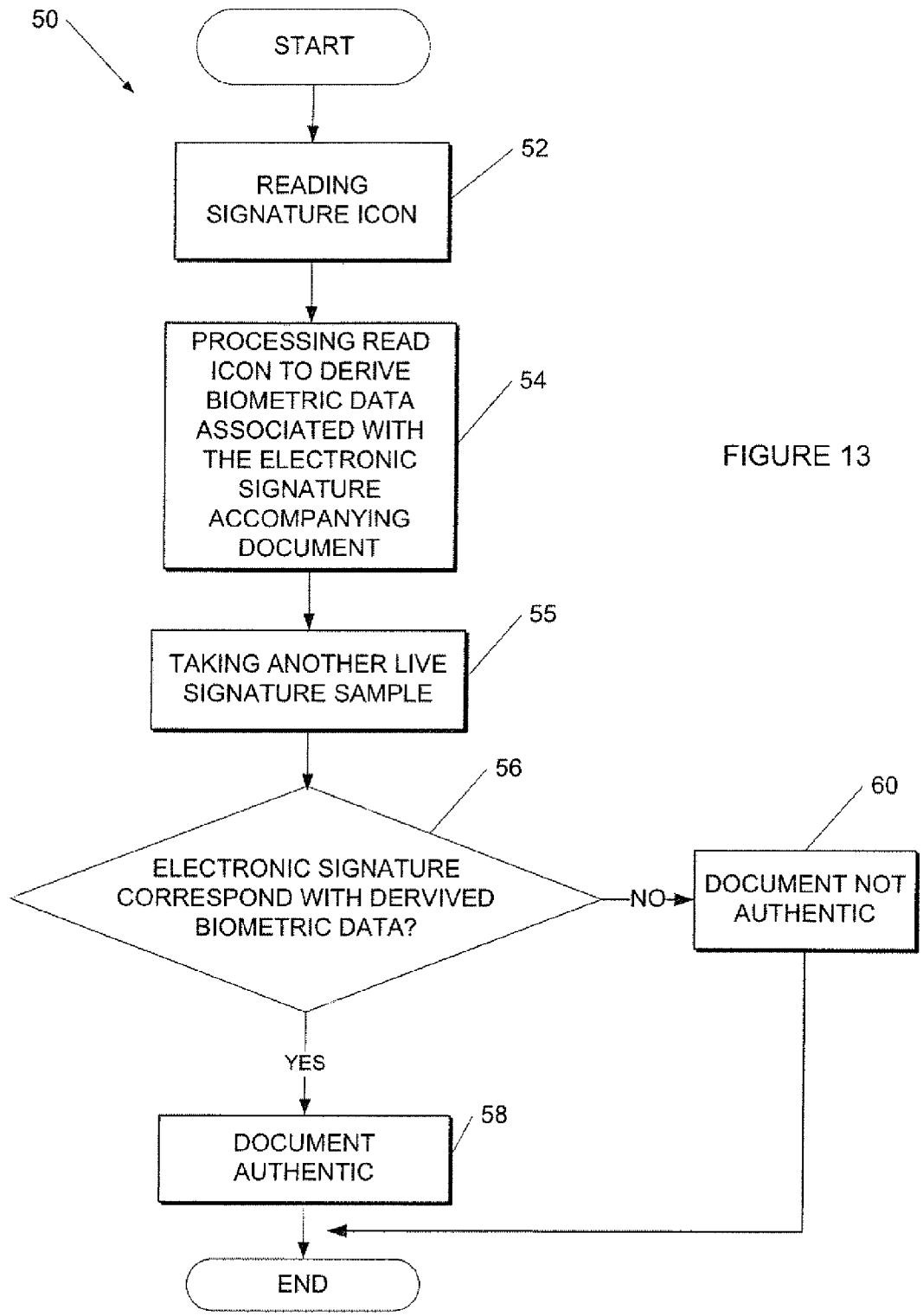
FIG. 13 shows another high level flow diagram of a method in accordance with an example embodiment.

Example embodiments will now be further described in use with reference to FIGS. 12 and 13. The example methods shown in FIGS. 12 and 13 are described with reference to FIGS. 1 to 11, although it is to be appreciated that the example methods may be applicable to other systems (not illustrated) as well.

Referring to FIG. 12 in particular, where a flow diagram of a method of authenticating an electronic signature, e.g., the electronic signature 24 provided in a document, e.g., document 22 is generally indicated by reference numeral 40.

It will be appreciated that the system 10 may be automatically actuated when a user 14 is signing a document 22. The actuation of the system 10 may be via the communications network 16 or via the computing device 12 associated with the user 14. In this regard, the system 10 may be configured to determine that a document 22 is to be signed by the user 14 via the device 18 and may be automatically actuated to provide the functionality described herein on such a determination.

In this regard, the method 40 may comprise initial steps of the user optionally registering to use the system 10. However, for the example under discussion, the system 10 is associated with an organization which is entering into a contractual relationship with the user 14, wherein the contractual relationship culminates in the signing of a contract document 22 electronically by the user 14.

Following the mentioned example embodiment, the organization entering into a relationship with the user 14 transmits, electronically via the communication network 16, a document 22 which requires signing by the user 14 in order to have legal effect. The user 14, on accepting terms and obligations set out in the document 22, typically signs the document electronically via an electronic signing device or the type similar to the electronic signing device 18 as hereinbefore described. The document 22 may be provided on a web page associated with the organization/system 10 or may be emailed to the user 14.

At this stage, when the document 22 is to be signed, it will be appreciated that the system 10 is actuated automatically. In the example embodiment under discussion, the system 10 renders functionality to the user 14 as described herein via the communication network 16.

In particular, the method 40 comprises receiving, at block 42, electronic signature data associated with an electronic signature of a signer 14 from the computing device 12 or the signing device 18 as the case may be via the communication network 16 substantially in a manner as previously described.

The method 40 then comprises processing, at block 44, the received electronic signature data in a predetermined manner to avoid tampering of the electronic signature data. This step may therefore comprise compressing and/or encrypting and/or encoding the received electronic signature data in a predetermined fashion and/or in accordance with a predetermined algorithm. The algorithm used in this step may be any secret algorithm so that when the signature icon 28 is generated (in the following step), the data used to generate the icon 28 is at least less susceptible for tampering with than if the raw electronic signature data is used.

However, it will be appreciated that the processing step 44 may be omitted from the method 40 and the received electronic signature data may just as well be used in the following step as will be described below.

The method 40 may then therefore advantageously comprise generating, at block 46, a signature icon or token by using at least the received electronic signature data as processed in the previous step or the raw received electronic signature data as the case may be. As previously mentioned, the signature icon may be a 2-dimensional computer readable visual code/barcode and in this regard, generating the icon 28 may comprise generating a QR code with the abovementioned processed/raw electronic signature data in substantially a conventional manner.

The method 40 then comprises providing, at block 48, the generated signature icon or token 28 on the document 22 signed electronically by the signer 14 by way of the electronic signature 24 in a manner that the signature icon or token 28 is exhibited on the document 22 at least when the document is printed or when the document 22 is displayed on a display screen associated with the computing device 12 associated with the user 14.

It will be appreciated that the method 40 may further comprise the step of locking, at block 49, the electronic document 22 from further modification. In other words, the method 40 comprises making or setting the document 22 to a read-only document and puts procedures in place that will invalidate the signature icon 28 or the signature 24 if either one or more of the document 22, electronic signature 24 and the signature icon 28 is tampered with. This is typically done by hashing a checksum of the document 22 and inserting it along with the signature token 28. This data is then stored. If the document 22 checksum doesn't match the stored checksum, one or more of the document 22, signature 24 and the signature icon 28 displays as invalid. The checksum, as well as the signature data are stored as a secure token signed with a certificate. It will be noted that these steps may be performed by module 30.

This is important as most organizations retain printed copies of the electronic document 22 and in this regard, the icon 28 being provided on the printed document 22 in addition to the electronic signature 24 advantageously allows to authentication of the electronic signature 24 without further evidence being provided as will be described further with reference to FIG. 13

Referring now to FIG. 13 of the drawings where another flow diagram of a method in accordance with an example embodiment is generally indicated by reference numeral 50.

To follow on from the example described above, when the document signed 22 by the user 14 is in dispute, for example, when the authenticity of the electronic signature 24 of the document 22 is brought to the fore it will be appreciated that conventionally it will be very difficult to prove that the electronic signature 24 is in fact authentic as in that of the user 14.

This is often exacerbated considering that it is the document which physically printed (along with the electronic signature) which is in question and not the electronically signed digital version thereof. In most cases, evidence will have to be furnished, for example, a freshly handwritten signature of the user 14 on paper to a human authenticator which will compare with the same with the electronic signature printed on the document 22.

However, the present invention seeks to address the problem of authenticating an electronic signature 24 on a printed document 22.

For example, when an authenticator of the electronic signature 24 desires to authenticate the same, they simply have to operate their reader 32 (which may be even a simple application, for example, on their smartphone) to read the signature icon 28 provided on the same printed document 22 as the electronic signature 24.

In this regard, the method 50 comprises firstly the step of reading (optically), at block 52, a signature icon 28 on a printed document 22 by way of a device 32 as described herein. It will be appreciated that this may be done in a similar fashion to a conventional barcode reader or scanner scanning a barcode or code printed on a surface.

The method 50 may then comprise processing, at block 54, the read signature icon 28, for example, in a conventional manner in order to extract or derive the biometric data associated with the electronic signature 24 accompanying the signature icon 28 on the document 22.

The method 50 advantageously comprises processing the extracted or derived biometric data further in order to reproduce or recreate a version of the electronic signature 24 in question. The version recreated may be a 3-dimensional recreation which may be spatially moved or may be reproduced as a function of time in order to assist an authenticator determine the authenticity of the corresponding printed version of the electronic signature 24.

It will be appreciate that because of encryption and/or compression and/or encoding of the biometric data as described above, the reader 32 is not able to tamper with the read biometric data as it is read-only data. This ensures integrity of the system 10 described herein.

The method 50 may then comprise taking or receiving, at block 55, another fresh signature (again via the device 18) of the user 14.

An authenticator may therefore be in a position to compare, at block 56, the electronic signature 24 printed on the document 22 or as received in step 55 the with the version re-created or reproduced by the device 32 or with the biometric data derived or extracted from the signature icon 28. The authenticator may be able to overlay the two signatures (the re-created one with either the signature from the document or freshly received, e.g., in step 55) and do a close inspection and analysis of the signatures. In this regard, if the reproduced electronic signature corresponds substantially to the electronic signature 24 printed on the document 22 then the electronic signature 24 provided on the document 22 is deemed to be authentic, block 58.

Instead, if the reproduced signature does not, correspond substantially to the electronic signature 24 printed on the document 22 then the electronic signature 24 provided on the document 22 is deemed to be not authentic, block 60.

It will be appreciated that the process of comparison may be carried out by a human authenticator or a machine authenticator. In case of the latter, the authenticator may be part of the system 10 and may be provided in the reader 32. The authenticator being configured to read a signature icon, read the printed version of the electronic signature 24 on the document 22 (for example, using image processing techniques) and process the same to perform the comparison as hereinbefore described.

Figure 14:
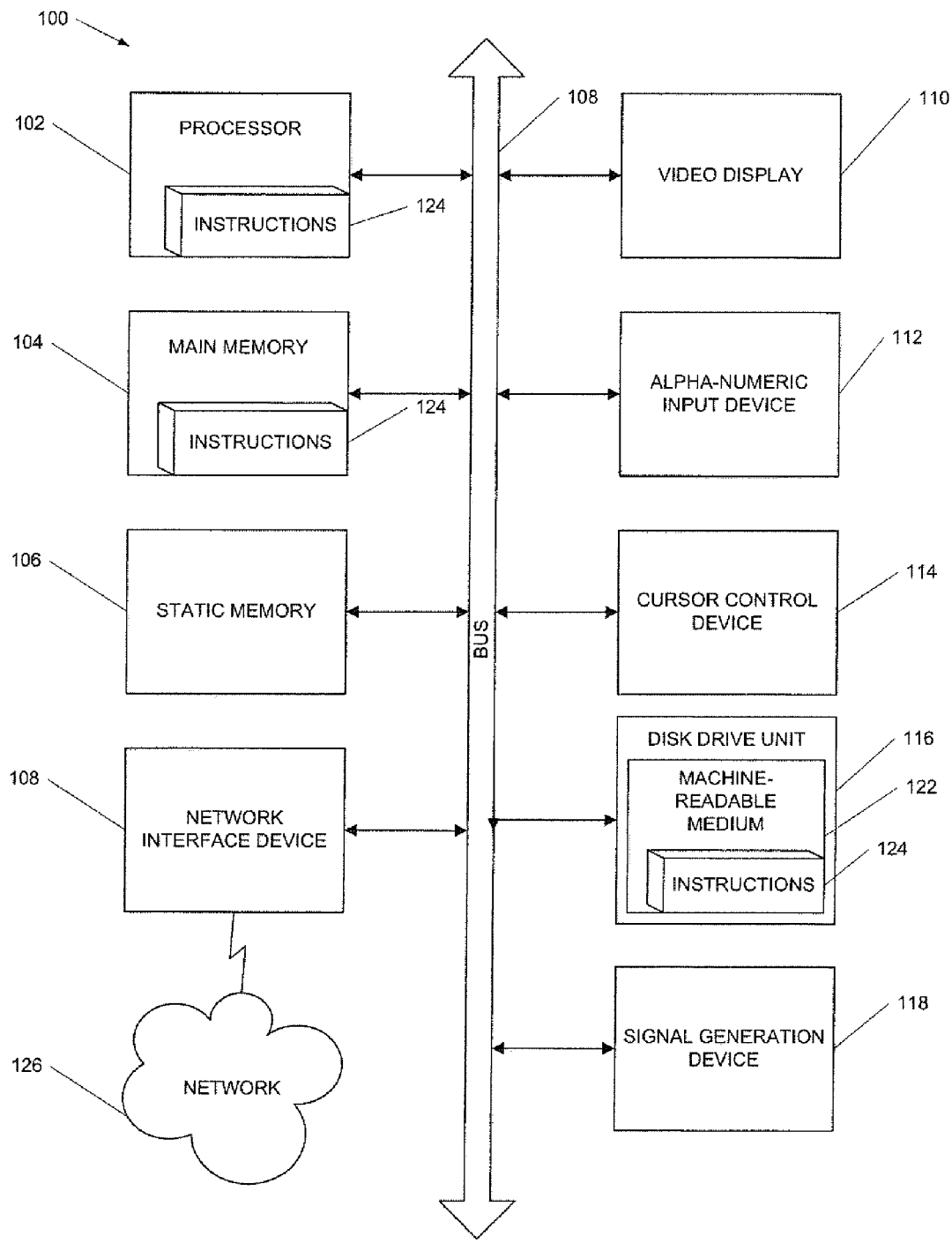
FIG. 14 shows a diagrammatic representation of a machine in the example form of a computer system in which a set of instructions for causing the machine to perform any one or more of the methodologies discussed herein, may be executed.

FIG. 14 shows a diagrammatic representation of machine in the example of a computer system 100 within which a set of instructions, for causing the machine to perform any one or more of the methodologies discussed herein, may be executed. In other example embodiments, the machine operates as a standalone device or may be connected (e.g., networked) to other machines. In a networked example embodiment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (FDA), a cellular telephone, a web appliance, a network router, switch or bridge, or any machine capable of executing a set of instructions (sequential or otherwise) that specify actions to be taken by that machine. Further, while only a single machine is show for ease of illustration, it will be appreciated that the term "machine" may also extend to any collection of machines that individually or in combination with each other execute a set (or multiple sets) of instructions to perform any one or more of the methodologies discussed herein.

In any event, the example computer system 100 includes a processor 102 (e.g., a central processing unit (CPU), a graphics processing unit (GPU) or both), a main memory 104 and a static memory 106, which communicate with each other via a bus 108. The computer system 100 may further include a video display unit 110 (e.g., a liquid crystal display (LCD) or a cathode ray tube (CRT)). The computer system 100 also includes an alphanumeric input device 112 (e.g., a keyboard), a user interface (UI) navigation device 114 (e.g., a mouse, or touchpad), a disk drive unit 116, a signal generation device 118 (e.g., a speaker) and a network interface device 120.

The disk drive unit 116 preferably includes a machine-readable medium 122 storing one or more sets of instructions and data structures (e.g., software 124) embodying or utilised by any one or more of the methodologies or functions described herein. The software 124 may also reside, completely or at least partially, within the main memory 104 and/or within the processor 102 during execution thereof by the computer system 100, the main memory 104 and the processor 102 also constituting machine-readable media.

The software 124 may further be transmitted or received over a network 126 via the network interface device 120 utilising any one of a number of well-known transfer protocols (e.g., HTTP).

Although the machine-readable medium 122 is shown in an example embodiment to be a single medium, the term "machine-readable medium" may refer to a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilised by or associated with such a set of instructions. The term "machine-readable medium" may accordingly be taken to include, but not be limited to, solid-state memories, optical and magnetic media, and carrier wave signals.

When compared with traditional pen-to-paper signatures, it is obvious that for the purposes of authentication, electronic signatures provide far more insight into the biometric attributes of a signature that can be used to more accurately identify and authenticate signers. In this regard, the invention as hereinbefore described advantageously addresses the legal limitations of electronic signatures, this invention provides a method for visually representing biometric data associated with the electronic signature so that it may be printed out with the electronically signed document for the purposes of authentication. In this way, the invention facilitates authentication of documents signed electronically by way of electronic signatures more easily.

The invention claimed is:

1. A method for facilitating authentication of an electronic signature, the method including:
   receiving electronic signature data associated with an electronic signature of a signer, the electronic signature data comprising at least biometric data associated with at least one of the electronic signature and the signer;
   generating a signature icon by using at least the received electronic signature data, wherein the signature icon comprises a coded visual representation of the electronic signature data including the biometric data, wherein the signature icon is comprised of a machine readable matrix or 2-dimensional code that is readable by a machine; and
   providing the signature icon on a document signed by the signer by way of the electronic signature such that the signature icon is exhibited on the document at least when the document is printed or when the document is displayed on a display screen associated with a computing device or machine, wherein the signature icon facilitates authenticating the electronic signature of the signer, wherein, when read by the machine, the signature icon enables the machine to derive at least the biometric data associated with the electronic signature.

2. A method according to claim 1 further including receiving electronic signature data via an electronic signing device.

3. A method according to claim 2 wherein the electronic signing device is a tablet computing device and an associated writing implement and the signer signs their signature on the tablet computing device by way of the associated writing implement in a conventional fashion to signing a handwritten signature thereby to generate the electronic signature.

4. A method according to claim 1 further including receiving electronic signature data comprising information indicative of one or more of spatial co-ordinates of the writing implement relative to the tablet computing device when the signer signs their signature, pressure of the strokes used by the signer when executing their signature by way of the electronic signing device, and a time based metric of the user signing their signature.

5. A method according to claim 4 wherein the time based metric is the speed at which signature strokes were made.

6. A method according to claim 1 further wherein the electronic signature data received comprises information indicative of one or more of the order and direction of signature strokes, and information indicative of when the writing implement was lifted between strokes during signing.

7. A method according to claim 1 further including visually replicating the electronic signature of the signer thereby facilitating authentication of the electronic signature of the signer.

8. A method according to claim 1 wherein the signature icon is a QR (Quick Response) code.

9. A method according to claim 1 further including at least one of compressing, encoding and encrypting the received electronic signature data according to a predetermined algorithm, and generating the machine readable matrix or 2-dimensional code.

10. A system for facilitating authentication of an electronic signature, the system including:
    signature data receiver module configured to receive electronic signature data associated with an electronic signature of a signer, the electronic signature data comprising at least biometric data associated with at least one of the electronic signature and signer;
    an icon generating module configured to generate a signature icon by using at least the received electronic signature data, wherein the signature icon comprises a coded visual representation of the electronic signature data including the biometric data, wherein the signature icon is comprised of a machine readable matrix or 2-dimensional code that is readable by a machine; and
    a document updating module configured to provide the signature icon on a document signed by the signer by way of the electronic signature such that the signature icon is exhibited on the document when the document is printed or when the document is displayed on a display screen associated with a computing device or machine, wherein the signature icon facilitates authenticating the electronic signature, wherein, when read by the machine, the signature icon enables the machine to derive at least the biometric data associated with the electronic signature.

11. A system according to claim 10 wherein the signature data receiver module is communicatively coupled with an electronic signing device to receive electronic signature data therefrom.

12. A system according to claim 11 wherein the electronic signing device is an electronic signature pad or tablet computing device and an associated writing implement.

13. A system according to claim 10 wherein the signature data receiver module is configured to receive electronic signature data comprising information indicative of one or more of spatial co-ordinates of the writing implement relative to the tablet computing device when the signer signs their signature, pressure of the strokes used by the signer when executing their signature by way of the electronic signing device, speed at which the signature strokes were made, order and direction of signature strokes, and information indicative of when the writing implement was lifted between strokes during signing.

14. A system according to claim 10 wherein the suitable machine is configured to visually replicate the electronic signature of the signer thereby facilitating authentication of the electronic signature of the signer.

15. A system according to claim 10 wherein the signature icon is a QR (Quick Response) code.

16. A system according to claim 10 wherein the icon generating module is configured to encrypt the received electronic signature data and generate the machine readable matrix or 2-dimensional code.

* * * * *